(12) United States Patent
Seitel

(10) Patent No.: US 7,729,392 B2
(45) Date of Patent: Jun. 1, 2010

(54) MONOBLOCK LASER WITH REFLECTIVE SUBSTRATE

(75) Inventor: Steven C. Seitel, Bozeman, MT (US)

(73) Assignee: Scientific Materials Corporation, Bozeman, MT (US)

( * ) Notice: Subject to any disclaimer, the term of this patent is extended or adjusted under 35 U.S.C. 154(b) by 0 days.

(21) Appl. No.: 11/340,305

(22) Filed: Jan. 26, 2006

(65) Prior Publication Data

US 2006/0171429 A1 Aug. 3, 2006

Related U.S. Application Data

(60) Provisional application No. 60/647,906, filed on Jan. 28, 2005.

(51) Int. Cl.
*H01S 3/11* (2006.01)
(52) U.S. Cl. .................... 372/10; 372/21; 372/50.1
(58) Field of Classification Search .............. 372/10, 372/21, 50.1, 27, 106
See application file for complete search history.

(56) References Cited

U.S. PATENT DOCUMENTS

| | | | | |
|---|---|---|---|---|
| 3,641,458 | A | * | 2/1972 | La Tourrette et al. ........... 372/93 |
| 4,731,795 | A | | 3/1988 | Clark et al. .................. 372/107 |
| 5,181,211 | A | | 1/1993 | Burnham et al. .............. 372/21 |
| 5,249,195 | A | * | 9/1993 | Feldman et al. .......... 372/45.01 |
| 5,436,920 | A | * | 7/1995 | Minemoto et al. ............. 372/21 |
| 5,608,744 | A | | 3/1997 | Hovis et al. .................... 372/21 |
| 5,675,594 | A | | 10/1997 | Hovis et al. .................... 372/22 |
| 5,679,964 | A | * | 10/1997 | Kobayashi et al. ............. 257/83 |
| 5,754,333 | A | | 5/1998 | Fulbert et al. ................ 359/330 |
| 5,841,798 | A | | 11/1998 | Chen et al. .................... 372/ 11 |
| 5,953,362 | A | * | 9/1999 | Pamulapati et al. ........... 372/96 |
| 6,031,853 | A | | 2/2000 | Greene et al. ................. 372/22 |
| 6,170,795 | B1 | | 1/2001 | Wayne ........................ 248/664 |
| 6,212,212 | B1 | * | 4/2001 | Honmou .................. 372/43.01 |
| 6,744,801 | B2 | | 6/2001 | Nettleton et al. .............. 372/50 |
| 6,317,278 | B1 | | 11/2001 | Metsala ....................... 359/813 |

(Continued)

OTHER PUBLICATIONS

"Monoblock laser for a low-cost, eyesafe, microlaser range finder", by J. Nettleton et al., *Applied Optics*, vol. 39, No. 15, May 20, 2000, pp. 2428-2432.
*Fundamentals of Optics*, $3^{RD}$ Ed., F. Jenkins et al., 1957, pp. 24-25.

*Primary Examiner*—Minsun Harvey
*Assistant Examiner*—Delma R Forde
(74) *Attorney, Agent, or Firm*—Haynes and Boone, LLP

(57) ABSTRACT

In an internal OPO, a substrate comprising a thin film lies along an axis and a first mirror reflects first wavelength light. A gain medium lases and polarizes light entering therein and a Q-switch attenuates and transmits first wavelength light. An HR/HT mirror passes first wavelength light and reflects a second wavelength light, and an OPO rod converts a portion of the first wavelength light into second wavelength light. An output coupler (OC) reflects first wavelength light and passes a portion of second wavelength light, the first wavelength reflecting between the first mirror, the OC and through the gain medium and the Q-switch. The second wavelength light reflects between the HR/HT mirror and OC and through the OPO rod. The invention applies to external OPO as well.

The thin film reflects the light towards the gain medium, permitting a lower power lightsource and increasing the efficiency of the gain medium.

74 Claims, 2 Drawing Sheets

U.S. PATENT DOCUMENTS

| | | | |
|---|---|---|---|
| 6,373,865 B1 * | 4/2002 | Nettleton et al. | 372/10 |
| 6,377,593 B1 | 4/2002 | Peterson et al. | 372/11 |
| 6,501,772 B1 | 12/2002 | Peterson | 372/10 |
| 6,536,736 B2 | 3/2003 | Wayne et al. | 248/664 |
| 6,556,614 B2 * | 4/2003 | Nettleton et al. | 372/107 |
| 6,566,614 B1 | 5/2003 | Fluckiger et al. | 177/180 |
| 6,570,895 B2 | 5/2003 | Heberle | 372/34 |
| 6,669,367 B2 * | 12/2003 | Lin et al. | 383/14 |
| 6,710,914 B2 * | 3/2004 | Arbore et al. | 359/330 |
| 6,735,234 B1 * | 5/2004 | Paschotta et al. | 372/75 |
| 6,754,418 B1 | 6/2004 | Holm et al. | 385/49 |
| 6,778,581 B1 * | 8/2004 | Lipson | 372/96 |
| 6,826,329 B2 | 11/2004 | Imada | 385/35 |
| 6,839,493 B2 | 1/2005 | Berto | 385/52 |
| 6,900,472 B2 * | 5/2005 | Kondoh et al. | 257/94 |
| 2003/0138012 A1 * | 7/2003 | Wang et al. | 372/39 |
| 2004/0066805 A1 | 4/2004 | Afzal et al. | 372/10 |
| 2004/0218652 A1 | 11/2004 | Spariosu et al. | 372/70 |
| 2006/0092991 A1 * | 5/2006 | Nettleton | 372/10 |
| 2006/0092992 A1 * | 5/2006 | Nettleton | 372/10 |
| 2006/0280221 A1 * | 12/2006 | Seitel | 372/100 |

* cited by examiner

US 7,729,392 B2

MONOBLOCK LASER WITH REFLECTIVE SUBSTRATE

CROSS-REFERENCE TO RELATED APPLICATION

The present application is based on and claims the benefit of U.S. provisional patent application Ser. No. 60/647,906, filed Jan. 28, 2005, the content of which is hereby incorporated by reference in its entirety.

BACKGROUND OF THE INVENTION

The present invention relates to solid state lasers having an output in the near infrared, especially those lasers which have a compact size and have a high peak output power.

Recent advances in lasers have lead to monoblock lasers which feature a number of optical elements assembled on a substrate to provide a single piece laser of a compact size. These monoblock lasers are used in the area of range finding and surveying applications, and have been used in commercial and military applications. For example, U.S. Pat. Nos. 6,556,614, 6,373,865 and 6,744,801 to Nettleton show monolithic and pseudo-monblithic laser resonators on a substrate.

Monoblock lasers resonators have a set of gain rods, generally a Q-switch and an OPO with various mirrors arranged linearly along the length of a substrate. Light from flash lamps or from diode lasers is coupled into a rod of lasing material such as Nd:YAG or the like, and the light moves bidirectionally through the rod, bouncing between a highly reflective (HR) mirror and an output coupler (OC) mirror placed on either end of the lasing rod. In range finding applications there generally is a Q-switch to provide a pulsed output.

In some applications, an eye-safe (near infrared wavelength (e.g., 1.54 micron)) laser output is desirable. To that end, an optical parametric oscillator (OPO) is introduced into the optical path, to change the output wavelength from 1.1 micron, the output wavelength of the commonly used Nd:YAG lasing material, to a desired eye-safe wavelength such as 1.54 micron.

Certain monoblock laser designs have combinations of lamps above the gain rods and/or discrete reflectors placed underneath the substrate, in order to achieve acceptable lasing thresholds at a given power consumption. This method suffers from undesirably high scattering losses in the fine-ground substrate as well as angle-of-acceptance issues which prevent the reflected light from entering the gain rods. Another known method includes gluing a metal strip under the gain rods, which compromises glue joint integrity and leads to peeling of the metal strip because of undesirable thermal expansion coefficient mismatches. Furthermore, as monoblock lasers with wavelength shifting are commonly used in applications where power consumption must be minimized, it is desirable to minimize the amount of power required to operate the laser.

Consequently, a need exists for a monoblock laser which couples light into the gain rods more efficiently, but which does not increase overall input power requirements for the laser.

SUMMARY OF THE INVENTION

The present invention is directed to improvements for an eye-safe monoblock laser. In an internal OPO configuration, the apparatus includes a substrate disposed along an axis, a first mirror adapted to reflect light at a first wavelength and disposed perpendicularly to the axis. A gain medium for lasing and polarizing light entering therein is disposed along the axis and a Q-switch adapted to attenuate and transmit light at the first wavelength is disposed along the axis. An HR/HT mirror adapted to pass light at the first wavelength and reflect a light at a second wavelength is disposed perpendicularly to the axis as well. An OPO rod is adapted to convert a portion of the light at the first wavelength into the light at a second wavelength and is disposed along the axis. An output coupler (OC) disposed perpendicularly to the axis is adapted to reflect the light at the first wavelength and pass a portion of the light at the second wavelength, the light at the first wavelength reflecting between the first mirror and the OC and through the gain medium and the Q-switch. The light at the second wavelength reflects between the HR/HT mirror and the OC and through the OPO rod. The substrate of the monoblock laser has a thin film on it for reflecting the light towards the gain medium. The light reflected into the gain medium permits the use of a lower power light source than would otherwise be possible, as it effectively increases the efficiency of the gain medium.

It is expressly understood that the aspects of the present invention apply to other forms of monoblock lasers, such as those which have an external OPO configuration. The present invention is also applicable for use with any sort of a monoblock laser including without limitation, those which operate at a single wavelength (no frequency shifting second stage (e.g., OPO), those which operate without a Q-switch (monoblock CW lasers), and those which operate with various types of frequency-shifting or converting schemes (e.g., optical parametric amplifiers, harmonic generation, four-wave mixing and Raman shifting).

BRIEF DESCRIPTION OF THE DRAWINGS

Other objects and features of the present invention will become apparent from the detailed description when read in light of the attached drawings. It is understood that the drawings are for illustration only and are not intended to define the limits of the present invention.

Reference designators of the same number refer to previously described components of that reference number.

DETAILED DESCRIPTION OF ILLUSTRATIVE EMBODIMENTS

Figure 1:
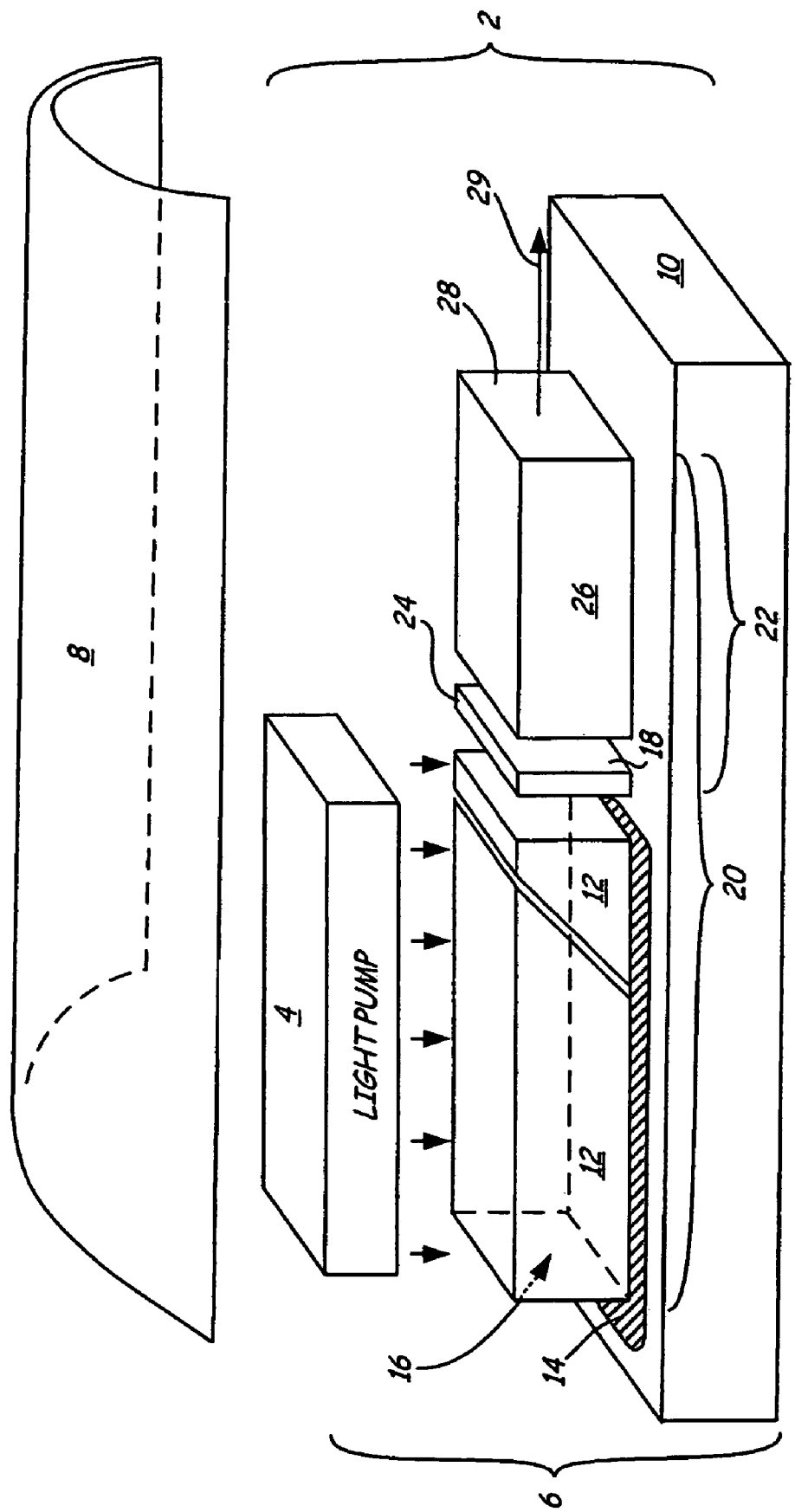
FIG. 1 is an elevated perspective view of an internal OPO embodiment of the present laser assembly according to the present invention.

FIG. 1 shows a monoblock laser of the present invention generally at 2, which includes a Light Source 4 coupling light into a resonator 6. Light Pump 4 can be a set of laser diodes, a single more powerful laser diode or, in a preferred embodiment, a flash lamp providing light at wavelengths 720-840 nm. Flashlamps are preferred in low repetition rate applications, while diodes permit operation at higher repetition rates as they generate less excess heat. A metal reflector 8 is disposed above and around laser assembly 2 so as to reflect light back into laser 2 for higher efficiency operation. Other sorts of reflectors, both diffuse and specular, including non-metallic reflectors can be used as well. Resonator 6 is supported by a substrate 10 which also provides support for the optical components in resonator 6, along their optical axis 29.

Substrate 10 is made of undoped Yttrium Aluminum Garnet (YAG), which is chosen because its temperature coefficient matches closely with the temperature coefficient of the pair of Brewster gain blocks 12. Other substrate materials may be used depending on the application. For example, other suitable substrate materials which are metallic (e.g., copper-tungsten alloy) or dielectric (e.g., aluminum nitride ceramic) may be used. Substrate thickness can be varied, but preferred dimensions are 3.5×3.5×67 mm. Other substrate sizes work as well, for example 4.75×4.75 by various lengths. The length of substrate 10 is only one of several design variables and is adjusted to balance operational specifications for the laser. For example, a low divergence laser has its HR/HT mirror and the output coupler further apart (and therefore, a longer substrate) than a wider divergence laser. Frequently, substrate 10 is 0.5 mm wider than the width of rods 12, which allow for simplified placement and alignment of components without "overhanging" the substrate. Overhanging optics are likely to suffer mechanical damage, especially non-linear dielectric rods such as an OPO as they vary lot-to-lot in optical axis orientation. Substrate 10 is shown with a flat surface, but in alternative embodiments it may have a rectangular or triangular profile. Regardless of the profile of the surface of the substrate, thin film 14 is disposed between the gain medium and the substrate, substantially underneath the gain medium. The YAG material of substrate 10 is preferred in low repetition rate applications as its thermal expansion coefficient is perfectly matched to that of gain rods 12. This matching reduces stress oh the glue joints (between gain blocks 12 and substrate 10) as the ambient temperature is varied over a wide range of temperatures. Mismatched temperature coefficients lead to undesirable stress on the glue joint, potentially causing glue joint failure.

An enhanced reflective thin film silver coating 14 (commonly available from a number of optical coating manufacturers) has been vacuum deposited on the surface of substrate 10 and preferably extends only under the gain rods. Other types of metal may be used for the coating, such as aluminum, gold, platinum and copper. Thin film 14 preferably has a higher reflectivity (either diffuse or specular) than substrate 10. A thin film comprised of alternating high and low index layers of dielectric is also contemplated. The purpose of the reflective thin film coating is to reflect the light between 720 and 840 nm back into gain rods 12, which is the range of wavelengths over which Nd:YAG excitation is most efficient. The thin film coating must reflect at least that range of wavelengths which excite the material used for the pair of gain rods. This reflected, or "second pass" absorption permits use of a lower power lamp to reach the same lasing threshold. In other words, the silver reflective coating of the present invention reduces the amount of electrical energy that the lamp consumes to reach a required lasing threshold. Without the present invention, a flashlamp which consumes more power would have to be used. The thin film malleable metallic reflector 14 is in intimate contact with the fine ground substrate so that film 14 substantially takes on the thermal characteristics of substrate 10, thereby substantially eliminating a difference in thermal expansion coefficients between the substrate and film 14. Laser assembly 2 with film 14 has been experimentally made and reduces the measured lasing threshold of laser assembly 2 by between 6% and 39%, so that less power is consumed to operate the flashlamp.

Gain rod 12 is made of YAG crystal doped with Neodymium (Nd:YAG) within the range 0.7% to 1.1%. Other materials such as Nd:YLF or any other solid state laser medium which can be pumped by a flashlamp or diodes are suitable, and may be preferred for generating wavelengths other than 1.06 microns. The ends of gain blocks 12 are polished to eliminate scattering losses and coated to reduce Fresnel reflection losses. Alternatively, Fresnel reflection losses could be minimized by angling the end faces of the pair of angled gain blocks. Pump light from light source 4 is partially absorbed in and partly transmitted by gain blocks 12. Nd:YAG is the material of choice as its physical properties (e.g., optical, spectroscopic, mechanical, thermal and electrical) are ideally suited to the manufacture of a rugged, efficient solid state laser gain medium. (A preferred source of Nd:YAG is Scientific Materials of Bozeman, MT.) The cross sectional profile of the optical components in laser 2 is square to allow for easy manufacture, but other cross sections such as circular, triangular and other shapes work as well. A preferred cross sectional size of gain rods 12 is 3 mm ×3 mm, but ultimately gain rod volume is set by power output specifications. A polished-end angled cut is made through gain rod 12 at the Brewster angle of the light traveling in the first resonant cavity, 1.06 micron. The angled Brewster angle cut linearly polarizes light in cavity 20, which is necessary for later wavelength shifting in a second resonant cavity 22. Placement of the angled cut is unimportant. It is well understood that the Nd:YAG with an angled Brewster cut chosen for this preferred embodiment functionally provides both gain and polarization. The gain function is required for making the most basic of lasers, but the polarization function is additionally required when later frequency shifting is desired. Therefore, alternative embodiments of gain medium 12 are uncut gain material with polarization achieved with a separate polarizing optic. One example of a separate polarizer is a thin-film cube polarizer or the like. Another way to achieve the polarization and the gain functions include the use of a polarizing gain medium such as Nd:YLF, which material is inherently polarizing without a Brewster angle cut through the crystal.

A highly reflective (HR) mirror 16 is deposited on one end of gain rods 12, to reflect light back into the pair of gain rods 12. Alternatively, mirror 16 may be deposited onto a cross section of a separate optic of glass, YAG or other optically transparent material, as appropriate. If so, a typical separate optic integrating a mirror is approximately 4 mm long, in order to provide adequate surface area for bonding to substrate 10. A passive Q-switch 24, preferably a $Cr^{4+}$ doped YAG crystal, is also supported by substrate 10 and disposed with its cross section perpendicular to axis 29. Q-switch 24 is preferably located between gain blocks 12 and OPO crystal 26, but may be located anywhere between HR mirror 16 and OC 28. Q-switch 24 attenuates light up to a critical energy level and then quickly switches to a highly transmissive state, causing the laser to emit a short, high intensity output pulse, which is desirable for military laser range finders. Alternatively, Q-switch 24 may be made of other passive materials or be an active Q-switch operating according to electro-optic or acousto-optic principles. A dichroic mirror 18 is vacuum deposited on a cross section of Q-switch 24, and efficiently transmits light at 1.06 microns, and also efficiently reflects light at a wavelength of 1.54 microns (such light found in second resonant cavity 22).

Light at 1.06 micron which passes through dichroic mirror 18 enters optical parametric oscillator (OPO) crystal 26. OPO 26 is a non-linear dielectric material oriented for non-critical phase matching, preferably made of KTA (Potassium Titanyl Arsenate) or the like, which converts light at the first wavelength to light at a second eye-safe wavelength of 1.54 micron. Other types of crystals, such as KTP (Potassium Titanyl Phosphate) may be used, depending on the desired second stage wavelength. Nonlinear crystals cut at different angles for critical phase matching can also be used to generate other wavelengths. Any optical material which exhibits an intensity-dependent internal polarizability is a candidate for consideration as the wavelength shifting component of an OPO. An output coupler (OC) mirror 28 is vacuum deposited on a distal end of OPO crystal 26, which passes a portion of the light at 1.54 microns as a final output of laser assembly 2 and reflects light at 1.06 microns back into first resonant cavity 20. Second resonant cavity 22 is formed of dichroic mirror 18, OPO crystal 26 and output coupler 28, in which the remainder of the light at 1.54 micron reflects between mirrors 18 and OC 28 and through crystal 26. Resonant cavity 22 may be lengthened to minimize divergence of the output light, in which case OC mirror 28 or mirror 18 is deposited on a separate optic of YAG or glass, as appropriate. For a monolithic OPO (an OPO having mirror 18 deposited on one of its ends and OC mirror 28 deposited on the other end), the parallelism between ends of crystal 26 is critical to maximizing output gain.

To manufacture laser resonator 6, all the above-mentioned components 12, 24 and 26 are cemented to substrate 10 using a thin, uniformly applied liquid, UV-curable bonding agent such as Norland 61 or the like. The thin layer of adhesive under gain blocks 12 must be substantially transparent to light from light source 4. The thin, uniform nature of the adhesive serves to limit tilt of the components during curing of the adhesive. An appropriate light source (such as light source 4) is turned on, and the output light at 1.54 micron is monitored for divergence and/or intensity, as the application requires. While monitoring the divergence and/or intensity of the output of resonator 6, HR mirror 16 (on pair of gain rods 12 in one embodiment), HR/HT mirror 24 (on Q-switch 24 in one embodiment) and OC 28 (on an end of OPO rod 26 in one embodiment) are critically aligned to maximize or minimize the desired attribute. Once critically aligned, UV light is directed at the liquid glue layers in resonator 6 to fix the components in place.

The present invention as shown in FIG. 1 is an internal OPO design, as second resonant cavity 22 lies within first resonant cavity 20. It will be understood that minor modifications can be made to the present invention, such as modifying the position of mirrors onto a separate optic without limitation; disposing dichroic mirror 18 on a distal end of Q-switch 24, or using an alternatively shaped substrate, without departing from the spirit and scope of the invention.

Figure 2:
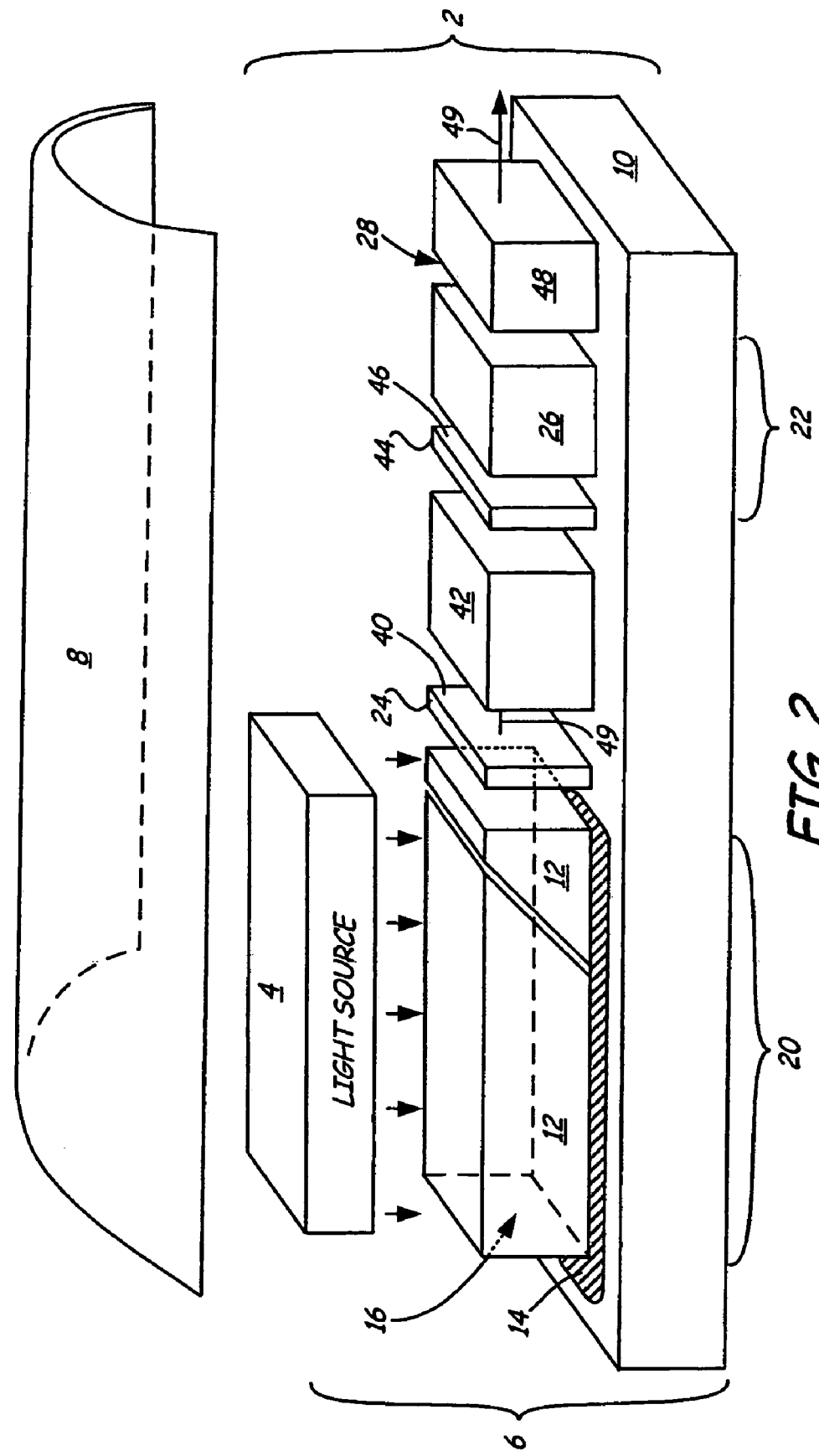
FIG. 2 is an elevated perspective view of an external OPO embodiment of the present laser assembly according to the present invention.

FIG. 2 shows an external OPO embodiment of the present invention with film 14 located under the pair of gain rods 12, for increasing the lasing efficiency of laser assembly 201. A first resonant cavity 200 includes the HR mirror 116 deposited on an end of gain medium 12, Q-switch 24, and a first OC mirror 140 deposited on a distal end of Q-switch 24. HR mirror 116 reflects 1.06 micron light with high efficiency. Mirror 140 partially reflects and partially transmits light at the first wavelength onto optional mode-matching optics 42. Mode matching optics 42 are employed as needed according to the application, to ensure that adequate energy and a low enough divergent beam are present in the second resonant cavity. An alternate embodiment for optics 42 is an appropriately oriented and spaced Galilean telescope. A separate mirror block 44 is disposed next in the optical path of resonator 60, with an HR/HT mirror 146 deposited on it. HR/HT mirror 146 efficiently passes light at the first wavelength, (1.06 micron) and efficiently reflects light at the second wavelength (1.54 micron). Nonlinear crystal 26 follows next along the optical axis 49, and another separate mirror optic 48 with an integrated second OC mirror 128 on its cross section is disposed on the end of substrate 10. Second OC mirror 128 partially reflects and partially transmits 1.54 micron light.

A thin film 14 of the present invention is disposed between gain medium 12 and substrate 10. Light from light source 4 is coupled to the gain medium 12 and second pass light reflected from film 14 enters the pair of gain rods 12. Alternative embodiments for thin film 14 are discussed herein, and apply equally well to any monoblock laser.

A second resonant cavity 22 is formed by mirror 146, nonlinear optic 26 and second output coupler mirror 128. Light from optional matching optics 42 enters nonlinear dielectric 26, which converts light at the first wavelength to light at the second wavelength. Second OC mirror 128 substantially passes a portion of the light at the second wavelength (1.54 micron) as an output of laser assembly 201, and reflects the remainder back into nonlinear dielectric 26. This embodiment of the present invention has the benefit of increasing the lasing efficiency because gain medium 12 absorbs more second pass light reflected from thin film 14.

The present invention of a thin film disposed underneath a gain medium in a solid state (monoblock) laser is understood to be applicable to any type of monoblock laser. Although the present invention has been described with reference to preferred embodiments, workers skilled in the art will recognize that changes may be made in form and detail without departing from the spirit and scope of the invention. For example, the second resonant cavity of FIG. 2 can readily be replaced by other means for generating second wavelengths, including but not limited to an optical parametric amplifier or a harmonic generation crystal cut and oriented for frequency multiplication. Furthermore, various combinations of optics having the same function as those described herein, such as those which vary in cross sectional shape and material, or those which have a modified order of placement but accomplish the same function as those laser resonators described herein, are understood to come within the present invention.

What is claimed is:

1. An optically pumped laser apparatus, comprising:
   a substrate disposed along an axis;
   a first mirror adapted to reflect light at a first wavelength and disposed perpendicularly to the axis;
   a gain medium adapted to receive an external light, the external light comprising a set of wavelengths which excites the gain medium, the gain medium adapted to lase and polarize the light at the first wavelength, the gain medium disposed along the axis;
   a Q-switch adapted to attenuate and transmit light at the first wavelength, the Q-switch disposed along the axis;
   an HR/HT mirror adapted to pass light at the first wavelength and reflect a light at a second wavelength, the HR/HT mirror disposed perpendicularly to the axis;
   an OPO rod adapted to convert a portion of the light at the first wavelength into the light at the second wavelength, the OPO rod disposed along the axis; and
   an output coupler (OC) disposed perpendicularly to the axis and adapted to reflect the light at the first wavelength and pass a portion of the light at the second wavelength so as to provide an output, the light at the first wavelength reflecting between the first mirror and the OC and though the gain medium and the Q-switch and the light at the second wavelength reflecting between the HR/HT mirror and the OC and through the OPO rod, where the substrate has a film thereon disposed between the substrate and the gain medium, the film adapted to reflect at least some of the external light towards the gain medium so as to provide an additional amount of energy, where the film has a film thermal expansion coefficient (TCE) and the substrate has a substrate TCE, the film TCE and the substrate TCE having no substantial difference therebetween so that the film adheres to the substrate over a wide range of temperatures while the output comprises the additional amount of energy.

2. The apparatus of claim 1 where the substrate is made of YAG.

3. The apparatus of claim 1 where the film substantially reflects light in the range of wavelengths from 720 to 840 nm.

4. The apparatus of claim 1 where the film is made of material selected from the group of materials called Al, Au, Pt, Ag, Cu and dielectric.

5. The apparatus of claim 1 where the film is vacuum deposited.

6. The apparatus of claim 1 where the film is disposed substantially under the gain medium.

7. The apparatus of claim 1 where the gain medium is a pair of gain rods, the gain rods having a length of approximately 28 mm.

8. The apparatus of claim 1 where the first mirror is disposed on a separate optic.

9. The apparatus of claim 1 where the first mirror is disposed on an end of the gain medium.

10. The apparatus of claim 1 where the HR/HT mirror is disposed on a separate optic.

11. The apparatus of claim 1 where the HR/HT mirror is disposed on an end of the Q-switch.

12. The apparatus of claim 1 where the HR/HT mirror is disposed on an end of the OPO rod.

13. The apparatus of claim 1 where the HR/HT mirror is disposed on an end of the gain medium.

14. The apparatus of claim 1 where the OC is disposed on a separate optic.

15. The apparatus of claim 1 where the OC is disposed on an end of the OPO rod.

16. The apparatus of claim 1 where a flash lamp emits the external light.

17. The apparatus of claim 16 further comprising a mechanical housing disposed around the flash lamp.

18. The apparatus of claim 16 further comprising a plurality of reflectors disposed around the flash lamp.

19. The apparatus of claim 1 where a laser diode emits the external light.

20. The apparatus of claim 1 where the gain medium is a pair of gain rods having a common refractive index and an angled space therebetween.

21. The apparatus of claim 1 where the gain medium includes a gain rod and a polarizer.

22. An optically pumped laser apparatus, comprising:
substrate means disposed along an axis;
gain means adapted to receive an external light, the external light comprising a set of wavelengths which excites the gain means, the gain means disposed along the axis for lasing light entering therein;
HR means disposed on the substrate adjacent to the gain means, for reflecting the light; and
output coupler (OC) means disposed on the substrate along the axis adjacent to the gain means, the OC means for reflecting a portion of the light and for passing a portion of the light so as to provide an output, where the light enters the gain means and passes therethrough, the light reflecting between the HR means and the OC means, the OC means passing the portion of the light therethrough, where a thin film means is adapted to reflect at least some of the external light towards the gain means so as to provide an additional amount of energy and is disposed between the substrate means and the gain means, where the thin film means has a film thermal expansion coefficient (TCE) and the substrate means have a substrate TCE, where the film means TCE and the substrate means TCE have no substantial difference therebetween, so that the film means adheres to the substrate means over a wide range of temperatures while the output comprises the additional amount of energy.

23. The apparatus of claim 22 further comprising Q-switch means disposed along the axis for attenuating and transmitting the light entering therein, the Q-switch means disposed between the HR means and the OC means.

24. The apparatus of claim 23 where the Q-switch means is made of $Cr^{4+}$:YAG.

25. The apparatus of claim 23 where the HR means and the Q-switch means are disposed on a Q-switch, the Q-switch having an end, the end having a mirror disposed thereon.

26. The apparatus of claim 23 where the HR means is disposed on a separate optic.

27. The apparatus of claim 23 where the OC means and the Q-switch means are disposed on a Q-switch, the Q-switch having an end, the end having a mirror disposed thereon.

28. The apparatus of claim 23 where the OC means is disposed on a separate optic.

29. The apparatus of claim 23 where the OC means and the gain means are disposed on a gain rod, the gain rod having an end, the end having a mirror disposed thereon.

30. The apparatus of claim 22 where the gain means is a pair of gain rods cut by an angle, the angle substantially at the Brewster angle of the light traveling through the gain rods.

31. The apparatus of claim 22 further comprising polarizing means disposed along the axis between the HR means and the OC means, for polarizing the light entering therein.

32. The apparatus of claim 31 where the HR means and the polarizing means are disposed on a separate optic, the optic having an end, the end having a mirror thereon.

33. The apparatus of claim 31 where the OC means and the polarizing means are disposed on a separate optic, the optic having an end, the end having a mirror disposed thereon.

34. The apparatus of claim 22 where the substrate is made of YAG.

35. The apparatus of claim 22 where the HR means is disposed on a separate optic.

36. The apparatus of claim 22 where the HR means and the gain means are disposed on a gain rod, the gain rod having an end, the end having a mirror disposed thereon.

37. The apparatus of claim 22 where the OC means is disposed on a separate optic.

38. The apparatus of claim 22 where the OC means and the gain means are disposed on a gain rod, the gain rod having an end, the end having a mirror disposed thereon.

39. The apparatus of claim 22 where the thin film means is a thin film made of silver.

40. The apparatus of claim 22 where the thin film means is a metal selected from the group of metals called Al, Au, Pt, Ag, and Cu.

41. The apparatus of claim 22 where the thin film means is a dielectric.

42. The apparatus of claim 22 where the thin film means includes a first and a second layer of dielectric, the first layer having a high optical index of refraction and the second layer having a low optical index of refraction.

43. An optically pumped laser apparatus, comprising:
a substrate disposed along an axis;
an HR and a first OC mirror adapted to reflect light at a first wavelength, the first OC mirror further adapted to pass a portion of light at the first wavelength, the HR and the first OC mirror disposed perpendicularly to the axis;
a gain medium adapted to receive light from an external source, the external light comprising a set of wavelengths which excites the gain medium, the gain medium adapted to lase light at the first wavelength, and disposed along the axis;

a polarizing medium adapted to polarize lased light at the first wavelength, the polarizing medium disposed along the axis;

a Q-switch disposed along the axis, the Q-switch attenuating and transmitting light at the first wavelength;

a HR/HT mirror adapted to pass light at the first wavelength from the Q-switch and to reflect light at a second wavelength;

a frequency shifting optic for converting a portion of the light at the first wavelength to light at the second wavelength; and a second output coupler (OC) for reflecting light of the second wavelength towards the HR/HT mirror and passing a portion of the light of the second wavelength so as to provide an output, where the light of the first wavelength reflects between the HR mirror and the first OC mirror and through the gain medium and the polarizing medium, and where the light of a second wavelength reflects between the HR/HT mirror and the second OC and through the frequency shifting optic, where the substrate has a film, the film adapted to reflect at least some of the external light towards the gain medium so as to provide an additional amount of energy, the film disposed between the substrate and the gain medium, where the film has a film thermal expansion coefficient (TCE) and the substrate has a substrate TCE, where the film TCE and the substrate TCE have no substantial difference therebetween so that the film adheres to the substrate over a wide range of temperatures which the output comprises the additional amount of energy.

44. The apparatus of claim 43 where the gain medium is a pair of gain rods having a common refractive index and an angled space therebetween.

45. The apparatus of claim 43 where the thin film is a thin film made of silver.

46. The apparatus of claim 43 where the thin film is a metal selected from the group of metals called Al, Au, Pt, Ag, and Cu.

47. The apparatus of claim 43 where the thin film is a dielectric.

48. The apparatus of claim 43 where the thin film includes a first and a second layer of dielectric, the first layer having a high optical index of refraction and the second layer having a low optical index of refraction.

49. The apparatus of claim 43 where the gain medium is a gain rod and the HR mirror is on an end thereof 50. The apparatus of claim 43 where the HR mirror is on an end of the Q-switch.

51. The apparatus of claim 43 where the HR mirror is on a separate optic.

52. The apparatus of claim 43 where the gain medium is a gain rod and the first OC mirror is disposed on an end of the gain rod.

53. The apparatus of claim 43 where the first OC mirror is on a separate optic.

54. The apparatus of claim 43 where the first OC mirror is disposed on an end of the Q-switch.

55. The apparatus of claim 43 where the HR/HT mirror is disposed on an end of the frequency shifting optic.

56. The apparatus of claim 43 where the second OC is disposed on an end of the frequency shifting optic.

57. The apparatus of claim 43 where the second OC is disposed on a separate optic.

58. The apparatus of claim 43 where the frequency shifting optic is an OPO.

59. The apparatus of claim 56 where the OPO is made of a material selected from the group of materials called KTA and KTP.

60. The apparatus of claim 43 where the frequency shifting optic polarizes the light at the first wavelength as a function of an intensity of such light.

61. The apparatus of claim 43 where the substrate is YAG.

62. The apparatus of claim 43 where the substrate has a first thermal coefficient and the gain medium has a second thermal coefficient, where the first and the second thermal coefficient are substantially the same.

63. The apparatus of claim 43 where the gain medium is made of Nd:YAG.

64. A method for providing a laser light at a second wavelength, comprising:

providing a source of light;

exciting a gain medium with the light to provide a lasing light at a first wavelength, the gain medium supported by a substrate, the light comprising a set of wavelengths which excites the gain medium;

reflecting the lasing light at the first wavelength off an HR mirror and passing such light through the gain medium;

polarizing the lasing light at the first wavelength from the gain medium;

attenuating and transmitting the polarized light at the first wavelength;

passing the attenuated and transmitted light at the first wavelength through an HR/HT mirror, the mirror further adapted to reflect light at a second wavelength;

frequency shifting the light passed by the HR/HT mirror to laser light at the second wavelength; and outputting the laser light at the second wavelength so as to provide an output, where a film is adapted to reflect at least some of the light from the source of light towards the gain medium so as to provide an additional amount of energy and is disposed between the gain medium and the substrate, where the film has a film (TCE) and the substrate has a substrate TCE, where the film TCE and the substrate thermal expansion coefficient TCE have no substantial difference therebetween so that the film adheres to the substrate over a wide range of temperatures while the output comprises the additional amount of energy.

65. The method of claim 64 where the film is a thin film made of silver.

66. The method of claim 64 where the film is a metal selected from the group of metals called Al, Au, Pt, Ag, and Cu.

67. The method of claim 64 where the thin film is a dielectric.

68. The method of claim 64 where the thin film includes a first and a second layer of dielectric, the first layer having a high optical index of refraction and the second layer having a low optical index of refraction.

69. A monoblock laser resonator with a HR mirror, a gain medium, and an output coupler (OC) mirror supported by a substrate, the gain medium coupled to a pump light, the pump light comprising a set of wavelengths which excite the gain medium, the gain medium producing a laser light, the laser light reflecting off the HR mirror, through the gain medium and partially reflecting off the OC mirror, the OC mirror further adapted to pass a portion of the laser light therethrough so as to provide an output, where the improvement comprises a thin film adapted to reflect at least some of the pump light towards the gain medium so as to provide an additional amount of energy and disposed between the gain medium and the substrate, where the film has a film (TCE) and the substrate has a substrate TCE, where the film TCE and the substrate TCE have no substantial difference therebetween so that the film adheres to the substrate over a wide range of temperatures while the output comprises the additional amount of energy.

70. The apparatus of claim 1 where the film is in direct physical contact with both the substrate and the gain medium.

71. The apparatus of claim 22 where the thin film means is in direct physical contact with both the substrate means and the gain means.

72. The apparatus of claim 43 where the film is in direct physical contact with both the substrate and the gain medium.

73. The apparatus of claim 64 where the film is in direct physical contact with both the substrate and the gain medium.

74. The apparatus of claim 69 where the thin film is in direct physical contact with both the substrate and the gain medium.

* * * * *

UNITED STATES PATENT AND TRADEMARK OFFICE
CERTIFICATE OF CORRECTION

PATENT NO. : 7,729,392 B2
APPLICATION NO. : 11/340305
DATED : June 1, 2010
INVENTOR(S) : Steven C. Seitel It is certified that error appears in the above-identified patent and that said Letters Patent is hereby corrected as shown below:

In column 1, line 24, change "monblithic" to --monolithic--.

In column 3, line 27, change "oh" to --on--.

Signed and Sealed this

Tenth Day of August, 2010

David J. Kappos
*Director of the United States Patent and Trademark Office*